United States Patent
Wilgar et al.

(10) Patent No.: US 11,650,134 B2
(45) Date of Patent: May 16, 2023

(54) DETERMINING TREAD DEPTH USING DATA FROM A TIRE-MOUNTED SENSOR

(71) Applicant: SENSATA TECHNOLOGIES, INC., Attleboro, MA (US)

(72) Inventors: Jonathan Wilgar, Carrickfergus (GB); William D. Stewart, Antrim (GB)

(73) Assignee: SENSATA TECHNOLOGIES, INC., Attleboro, MA (US)

( * ) Notice: Subject to any disclaimer, the term of this patent is extended or adjusted under 35 U.S.C. 154(b) by 266 days.

(21) Appl. No.: 16/830,105

(22) Filed: Mar. 25, 2020

(65) Prior Publication Data
US 2021/0302272 A1    Sep. 30, 2021

(51) Int. Cl.
*G01M 17/02*    (2006.01)
*G01L 17/00*    (2006.01)
*G01P 3/44*    (2006.01)
*G01P 15/16*    (2013.01)
*G01S 19/01*    (2010.01)

(52) U.S. Cl.
CPC .............. *G01M 17/02* (2013.01); *G01L 17/00* (2013.01); *G01P 3/44* (2013.01); *G01P 15/165* (2013.01); *G01S 19/01* (2013.01)

(58) Field of Classification Search
None
See application file for complete search history.

(56) References Cited

U.S. PATENT DOCUMENTS

| | | | |
|---|---|---|---|
| 6,327,904 B1 | 12/2001 | Oldenettel | |
| 2007/0240501 A1* | 10/2007 | Mancosu | B60C 23/0408 73/146 |
| 2015/0239298 A1* | 8/2015 | Kretschmann | B60C 11/246 701/33.7 |
| 2017/0023441 A1* | 1/2017 | Luk | B60C 11/243 |
| 2017/0363515 A1 | 12/2017 | Poloni et al. | |
| 2021/0008933 A1 | 1/2021 | Kretschmann et al. | |

FOREIGN PATENT DOCUMENTS

| | | |
|---|---|---|
| CN | 108790619 A | 11/2018 |
| DE | 19716586 C1 | 8/1998 |
| WO | 2019102036 A1 | 5/2019 |

OTHER PUBLICATIONS

International Search Report and Written Opinion, PCT/US2021/020228, dated May 6, 2021, 15 pages.

* cited by examiner

*Primary Examiner* — Paul M. West
*Assistant Examiner* — Mark A Shabman
(74) *Attorney, Agent, or Firm* — Mark Williams (57) ABSTRACT

Determining tread depth using data from a tire mounted sensor (TMS), including: determining, based on data collected by the tire mounted sensor, a tire deformation for a tire; determining, based on the tire deformation, an effective rolling radius of the tire; and determining, based at least on the effective rolling radius of the tire, an estimated tread depth for the tire.

16 Claims, 9 Drawing Sheets

Determine, Based On Data Collected By The A Mounted Sensor, A Tire Deformation For A Tire 702

Determine, Based On The Tire Deformation, An Effective Rolling Radius Of The Tire 704

Determine, Based At Least On The Effective Rolling Radius Of The Tire, An Estimated Tread Depth For The Tire 706

FIG. 7

```
┌─────────────────────────────────────────────────────────────────────┐
│ Determine, Based On Data Collected By The A Mounted Sensor, A Tire  │
│                      Deformation For A Tire 702                     │
└─────────────────────────────────────────────────────────────────────┘
                                   │
                                   ▼
┌─────────────────────────────────────────────────────────────────────┐
│ Determine, Based On A Linear Velocity Of A Wheel Center Of The Tire │
│     And An Angular Velocity Of The Wheel Of The Tire, The Rolling   │
│                         Radius Of The Tire                          │
│                                 802                                 │
└─────────────────────────────────────────────────────────────────────┘
                                   │
                                   ▼
┌─────────────────────────────────────────────────────────────────────┐
│   Determine, Based On The Tire Deformation, An Effective Rolling    │
│                       Radius Of The Tire                            │
│                                 704                                 │
└─────────────────────────────────────────────────────────────────────┘
                                   │
                                   ▼
┌─────────────────────────────────────────────────────────────────────┐
│  Determine, Based At Least On The Effective Rolling Radius Of The   │
│              Tire, An Estimated Tread Depth For The Tire            │
│                                 706                                 │
└─────────────────────────────────────────────────────────────────────┘
```

FIG. 8

Determine, Based On Data Collected By The A Mounted Sensor, A Tire Deformation For A Tire 702

Determine, Based On The Tire Deformation, An Effective Rolling Radius Of The Tire 704

Receive One Or More Tire Parameters 902

Determine, Based At Least On The Effective Rolling Radius Of The Tire, An Estimated Tread Depth For The Tire 706

FIG. 9

DETERMINING TREAD DEPTH USING DATA FROM A TIRE-MOUNTED SENSOR

BACKGROUND

Load on a tire may be estimated by measuring various characteristics of a vehicle. For example, a vehicle-based height sensor may be used to estimate the load carried by the vehicle. However, these approaches require vehicle-specific sensors that must be calibrated to the specific springs and components of the vehicle. Moreover, load measurements using these vehicle-specific sensors, as well as subsequent calculations based on these load measurements, are prone to inaccuracy.

SUMMARY

In some embodiments, a method for determining tread depth using data from a tire mounted sensor (TMS), comprises: determining, based on data collected by the tire mounted sensor, a tire deformation for a tire; determining, based on the tire deformation, an effective rolling radius of the tire; and determining, based at least on the effective rolling radius of the tire, an estimated tread depth for the tire.

In some embodiments, the method further comprises determining, based on a linear velocity of a wheel center of the tire and an angular velocity of the wheel of the tire, the rolling radius of the tire. In some embodiments, the method further comprises receiving data indicating the linear velocity and the angular velocity. In some embodiments, the linear velocity is based on a Global Positioning System (GPS) doppler velocity. In some embodiments, the angular velocity is based on wheel speed sensor data. In some embodiments determining the tire deformation for the tire comprises determining, based on radial acceleration data, the contact patch length. In some embodiments, the method further comprises receiving one or more parameters; and wherein determining the estimated tread depth is further based on the one or more parameters. In some embodiments, the one or more parameters include a tire pressure or one or more tire stiffness parameters. In some embodiments, the method further comprises sending data indicating the estimated tread depth. In some embodiments, sending the data indicating the estimated tread depth comprises sending, via a transceiver of the TMS, to a vehicle control system (VCS), the data indicating the estimated tread depth.

In some embodiments, an apparatus for determining tread depth using data from a tire mounted sensor (TMS) is configured to perform steps comprising: determining, based on data collected by the tire mounted sensor, a tire deformation for a tire; determining, based on the tire deformation, an effective rolling radius of the tire; and determining, based at least on the effective rolling radius of the tire, an estimated tread depth for the tire.

In some embodiments, the steps further comprise determining, based on a linear velocity of a wheel center of the tire and an angular velocity of the wheel of the tire, the rolling radius of the tire. In some embodiments, the steps further comprise receiving data indicating the linear velocity and the angular velocity. In some embodiments, the linear velocity is based on a Global Positioning System (GPS) doppler velocity. In some embodiments, the angular velocity is based on wheel speed sensor data. In some embodiments determining the tire deformation for the tire comprises determining, based on radial acceleration data, the contact patch length. In some embodiments, the steps further comprise: receiving one or more parameters; and wherein determining the estimated tread depth is further based on the one or more parameters. In some embodiments, the one or more parameters include a tire pressure or one or more tire stiffness parameters. In some embodiments, the steps further comprise sending data indicating the estimated tread depth. In some embodiments, sending the data indicating the estimated tread depth comprises sending, via a transceiver of the TMS, to a vehicle control system (VCS), the data indicating the estimated tread depth.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION

The terminology used herein for the purpose of describing particular examples is not intended to be limiting for further examples. Whenever a singular form such as "a", "an" and "the" is used and using only a single element is neither explicitly nor implicitly defined as being mandatory, further examples may also use plural elements to implement the same functionality. Likewise, when a functionality is subsequently described as being implemented using multiple elements, further examples may implement the same functionality using a single element or processing entity. It will be further understood that the terms "comprises", "comprising", "includes" and/or "including", when used, specify the presence of the stated features, integers, steps, operations, processes, acts, elements and/or components, but do not preclude the presence or addition of one or more other features, integers, steps, operations, processes, acts, elements, components and/or any group thereof.

It will be understood that when an element is referred to as being "connected" or "coupled" to another element, the elements may be directly connected or coupled via one or more intervening elements. If two elements A and B are combined using an "or", this is to be understood to disclose all possible combinations, i.e. only A, only B, as well as A and B. An alternative wording for the same combinations is "at least one of A and B". The same applies for combinations of more than two elements.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure. Like numbers refer to like or similar elements throughout the description of the figures, which may be implemented identically or in modified form when compared to one another while providing for the same or a similar functionality.

Figure 1:
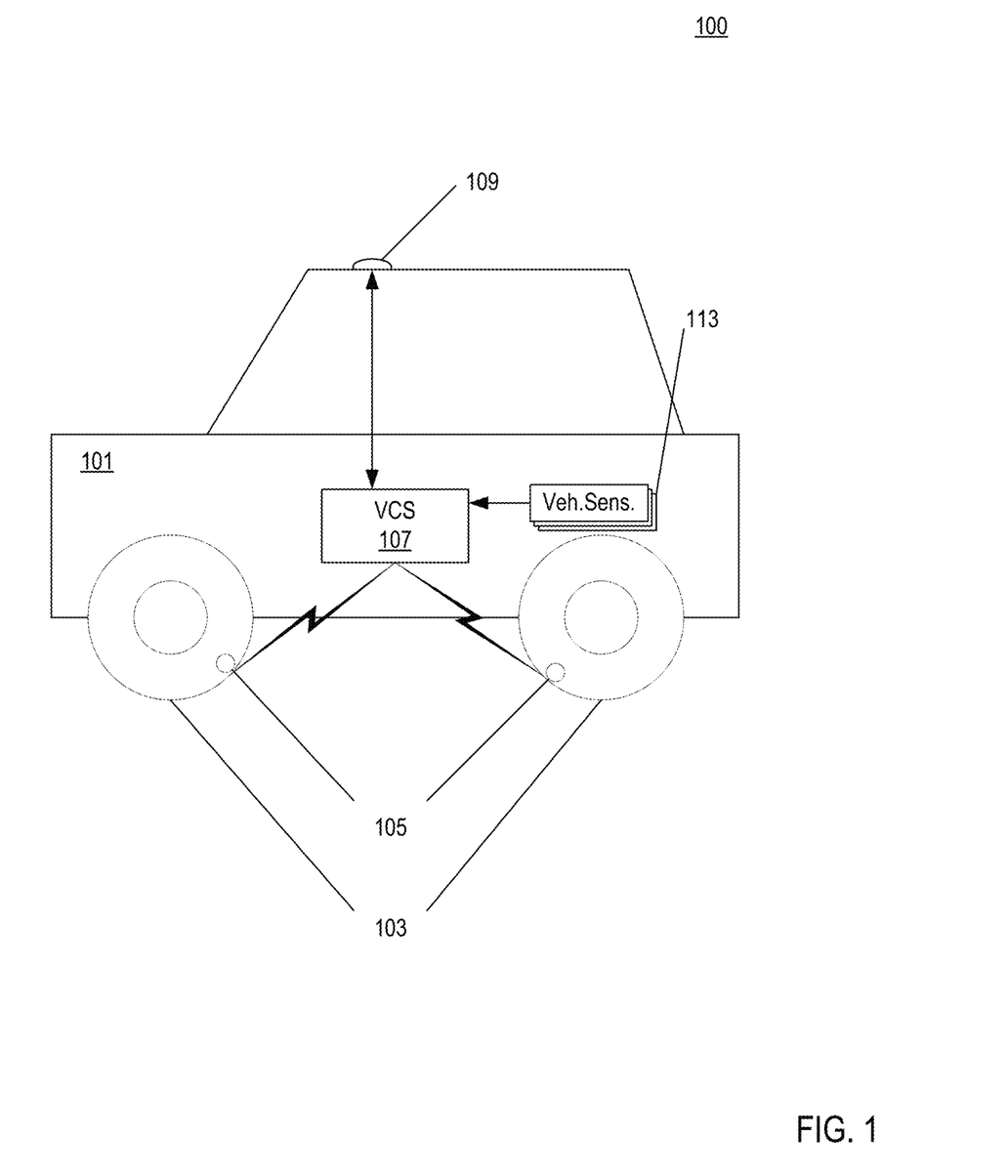
FIG. 1 sets forth a block diagram of a system for determining tread depth using data from a tire mounted sensor (TMS) in accordance with the present disclosure.

Exemplary methods, apparatuses, and computer program products for determining tread depth using data from a tire mounted sensor (TMS) in accordance with the present disclosure are described with reference to the accompanying drawings, beginning with FIG. 1. FIG. 1 sets forth a diagram of a system (100) for determining tread depth using data from a tire mounted sensor (TMS) according to embodiments of the present disclosure. The system of FIG. 1 includes a vehicle (101) equipped with tires (103) that include tire mounted sensors (TMSs) (105). While the embodiment of FIG. 1 shows two tires each equipped with a TMS (105), it will be understood that as few as one, and as many as all, of the tires (103) of the vehicle (101) may include a TMS (105). The vehicle of FIG. 1 further includes a vehicle control system (VCS) (107) that controls various components and systems within a vehicle. In a particular embodiment, the VCS (107) includes a plurality of electronic control units (ECUs) that are configured to control one or more vehicle subsystems. Commonly referred to as the vehicle's "computers", an ECU may be a central control unit or may refer collectively to one or more vehicle subsystem control units, such as an Engine Control Module (ECM), a Powertrain Control Module (PCM), a Transmission Control Module (TCM), a Brake Control Module (BCM), a Central Timing Module (CTM), a General Electronic Module (GEM), or a Suspension Control Module (SCM). In an embodiment according to the present disclosure, the VCS (107) includes a BCM that includes an Antilock Braking System (ABS) and an Electronic Stability Program (ESP). Alternatively, the VCS (107) may comprise a Telematics Control Unit (TCU) independent of vehicle-based sensors (e.g., an aftermarket system).

Each TMS (105) is equipped with a wireless transceiver for bidirectional wireless communication with the VCS (107), as will be described in more detail below. The VCS is similarly equipped with a wireless transceiver for bidirectional wireless communication with each of the TMSs (105), as will be described in more detail below. The bidirectional wireless communication may be realized by low power communication technology such as Bluetooth Low Energy or other low power bidirectional communication technology that is intended to conserve energy consumed. Alternatively, each TMS (105) may include a unidirectional transmitter configured to transmit signals to the VCS (107).

Each vehicle system may include sensors (113) used to measure and communicate vehicle operating conditions. For example, the ABS may include wheel speed sensors on the wheelbase used to measure wheel speed. The ESP subsystem may include yaw rate sensors configured to measure the yaw-induced acceleration of the vehicle when the vehicle is maneuvering a curve. Readings from such sensors (113) may be provided to the VCS (107), which may provide parameters based on these readings to the TMS (105).

The vehicle (101) may further include a transceiver (109) communicatively coupled to the VCS (107) for cellular terrestrial communication, satellite communication, or both.

The arrangement of devices making up the exemplary system illustrated in FIG. 1 are for explanation, not for limitation. Data processing systems useful according to various embodiments of the present disclosure may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), Bluetooth protocol, Near Field Communication, Controller Area Network (CAN) protocol, and others as will occur to those of skill in the art. Various embodiments of the present disclosure may be implemented on a variety of hardware platforms in addition to those illustrated in FIG. 1.

Figure 2:
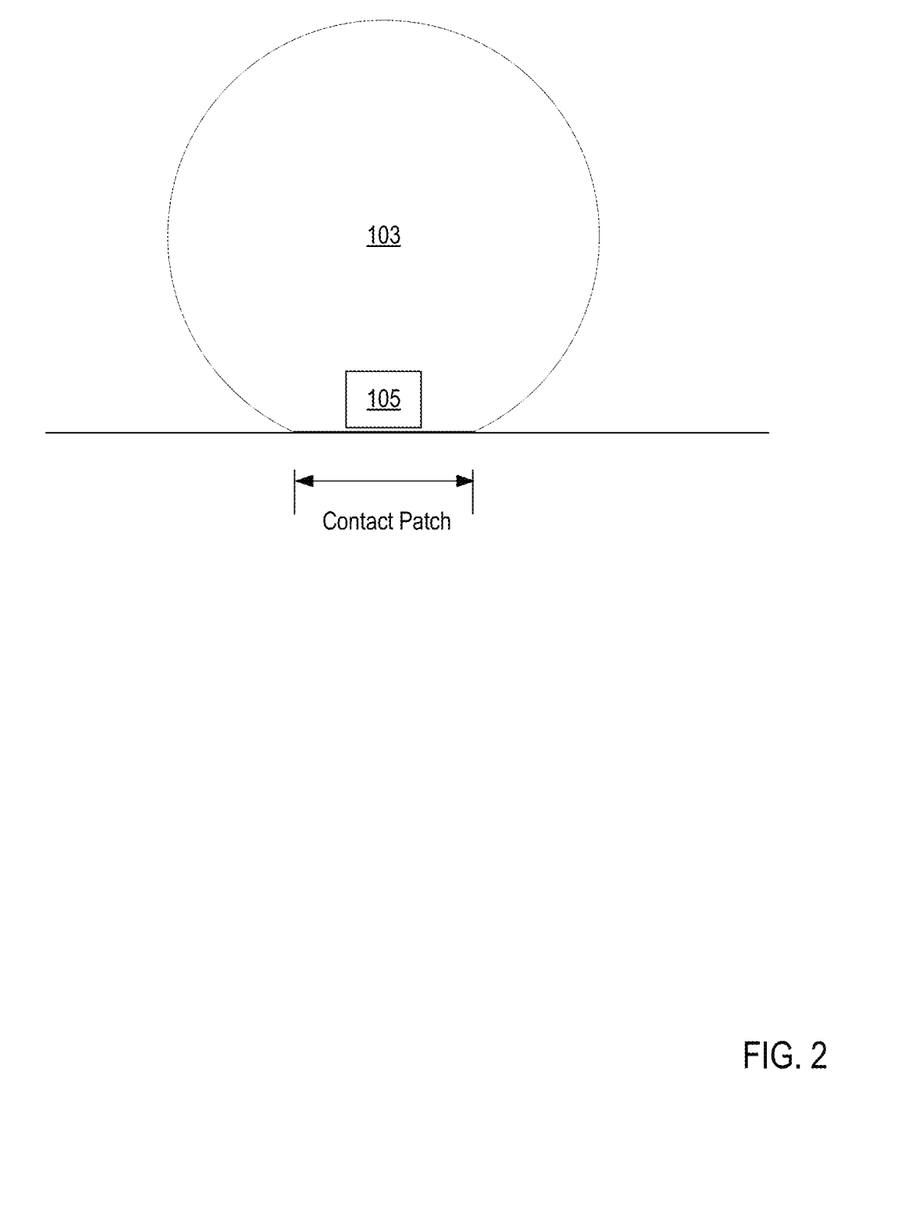
FIG. 2 illustrates a block diagram of a tire having a TMS configured for determining tread depth in accordance with the present disclosure.

FIG. 2 illustrates a block diagram of a tire having a TMS (105). Typically, the TMS (105) is mounted on, or otherwise coupled to, an internal surface of the tire (103), especially on the inner liner of the tire above the tread. As the tire (103) rotates, the portion that engages with the road surface at any given time is flattened. The flattened portion is known as the tire footprint or, interchangeably, contact patch. One or more features of the tire (103), in particular the length of the contact patch (typically measured in the direction of travel of the vehicle), may be used, for example, as an indication of the load on the tire (103). Electrical signals produced by the TMS (105) can be used to measure the contact patch, in particular its length, as will be described in more detail below. It will be understood that one or more of the tires (103) of the vehicle (101) may each include a TMS (105) for providing one or more target signals in respect of which pulse width measuring is performed.

Figure 3:
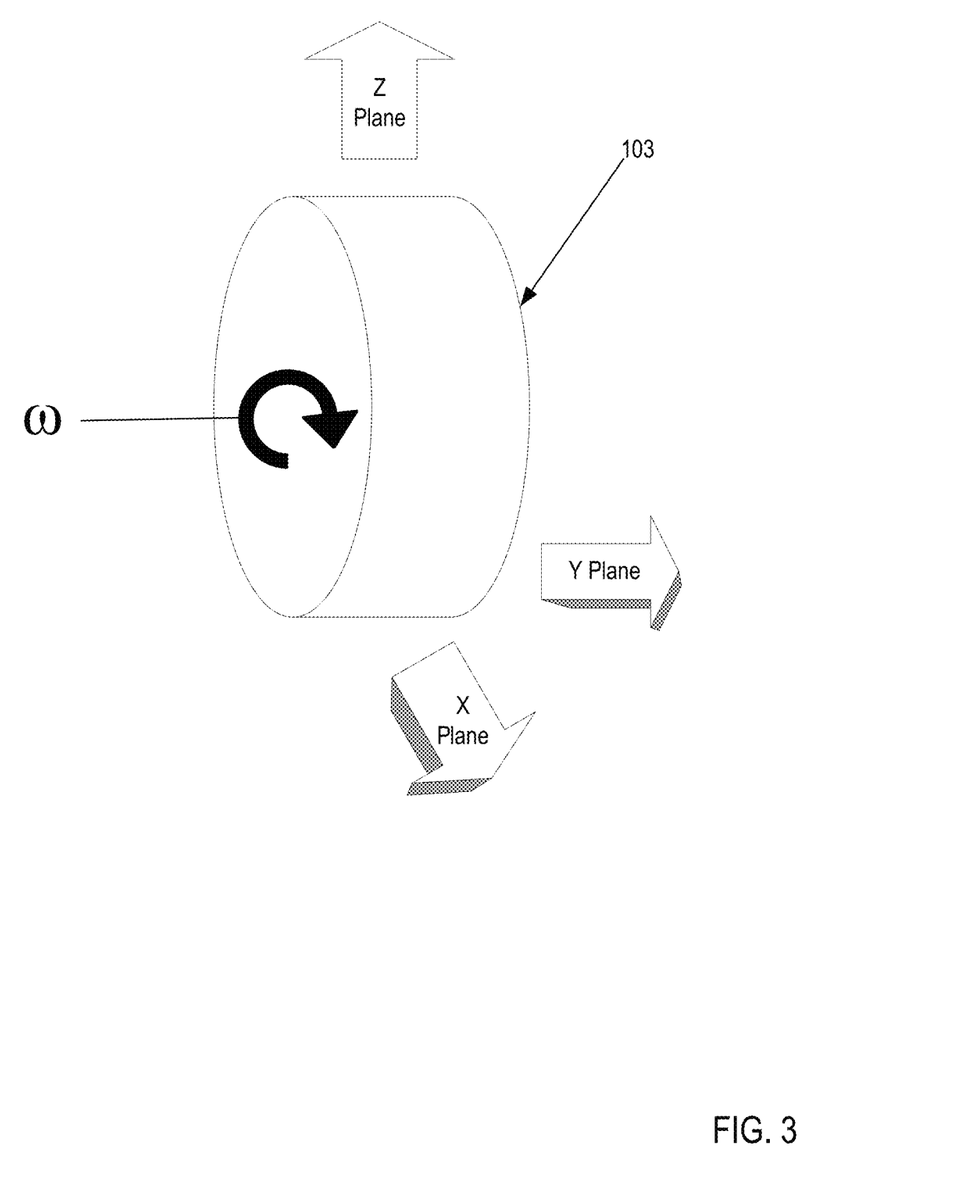
FIG. 3 illustrates a reference diagram of a tire in accordance with the present disclosure.

FIG. 3 illustrates reference diagram of a tire (103) in accordance with the present disclosure. As used in this disclosure, the z-axis of the tire (103) is the direction of radial force during rotation, the y-axis of the tire is the direction of lateral force during rotation, and the x-axis of the tire (103) is the direction of tangential force during rotation. The angular speed of rotation, in radians, is represented by w, and is also referred to herein as wheel speed.

Figure 4:
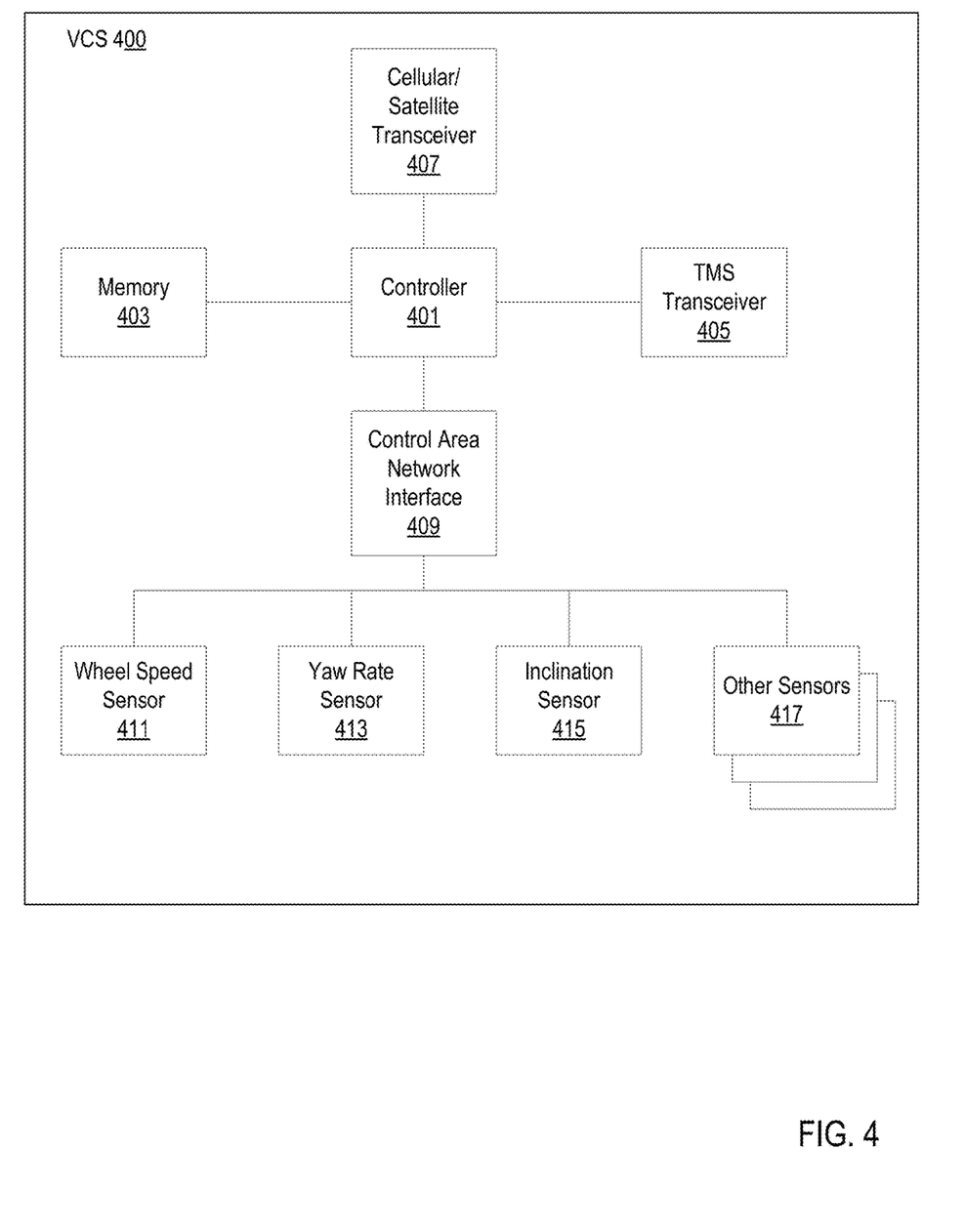
FIG. 4 illustrates a block diagram of an exemplary vehicle control system in accordance with the present disclosure.

For further explanation, FIG. 4 sets forth a diagram of an exemplary vehicle control system (VCS) (400) for determining tread depth using data from a tire mounted sensor (TMS) according to embodiments of the present disclosure. The VCS (400) includes a controller (401) coupled to a memory (403). The controller (401) is configured to obtain sensor readings related to vehicle operating conditions, as well as data from sources external to the vehicle, and provide configuration parameters to a TMS, such as TMS (600) (see FIG. 6). The controller may include or implement a microcontroller, an Application Specific Integrated Circuit (ASIC), a digital signal processor (DSP), a programmable logic array (PLA) such as a field programmable gate array (FPGA), or other data computation unit in accordance with the present disclosure. The sensor readings and data, as well as tire feature data received from the TMS, may be stored in the memory (403). The memory (403) may be a non-volatile memory such as flash memory. For example, the VCS (400) may obtain vehicle operating condition data such as sensor readings from sensors on-board the vehicle.

For bidirectional wireless communication with a TMS, the VCS (400) includes a TMS transceiver (405) coupled to the controller (401). In one embodiment, the TMS transceiver (405) is a Bluetooth Low Energy transmitter-receiver. In other embodiments, the TMS transceiver (405) may be other types of low power bidirectional communication technology that is intended to conserve energy consumed in the TMS. The VCS (400) may further include a transceiver (407) for cellular terrestrial communication, satellite communication, or both.

The VCS (400) may further comprise a controller area network (CAN) interface (409) for communicatively coupling vehicle sensors and devices to the controller (401). Of particular relevance to the present disclosure, the CAN interface (409) couples a wheel speed sensor (411), a yaw rate sensor (413), an inclination sensor (415), and other sensors (417), to the controller (401). The wheel speed sensor (411) measures the rotational angular speed of the wheel, e.g., in radians per second. The yaw rate sensor (413) may be used to measure the yaw-induced acceleration of the vehicle, for example, when the vehicle is maneuvering a curve, which will influence the magnitude of loading on each tire. The yaw rate sensor (413) may also provide information on the shear forces on the tire where it contacts the road. The inclination sensor (415) may detect longitudinal and/or transverse inclination of the vehicle. The wheel speed sensor (411), the yaw rate sensor (413), and the inclination sensor (415) transmit respective readings to the controller (401).

The controller (401) is configured to receive tire feature data from the TMS, for example contact patch length (CPL) or peak radial displacement (PRD) described above. Based on the tire feature data, the processor is configured to calculate a tire load or compensate a TMS derived load for vehicle dynamics/conditions. In some embodiments, the controller (401) may be configured to calculate tread depth based on data retrieved from the TMS while driving. For example, the controller (401) can receive, via the TMS transceiver (405), data from a TMS indicating the CPL of a tire. The controller (401) can then determine the load for the tire using a stored characteristic equation for determining load based on the CPL and other factors, such as tire pressure, tire speed, tire temperature, etc. For example, the controller (401) can receive data indicating these other factors from the TMS via the TMS transceiver (405), or from other sensors (e.g., tire pressure sensors, etc.).

Having determined the load for the tire using the stored characteristic equation for determining the load based on the PRD, tire deformation, or CPL, the controller (401) can then determine an estimated tread depth for the tire based on a modified rolling radius of the tire. A rolling radius for the tire may be expressed as a function of a load on the tire, tire pressure, tire stiffness, tread depth, and speed of the tire. Accordingly, the tread depth of the tire may be determined based on a load on the tire (which may itself be based on factors including tire pressure, tire stiffness, and/or speed), and rolling radius of the tire. The tire stiffness may be expressed as one or more tire stiffness parameters. For example, the one or more tire stiffness parameters may comprise one or more tire stiffness coefficients in a polynomial function for tire stiffness. For example, the one or more tire stiffness coefficients may be determined for a given tire model under varying loads and pressures using a drum tester, flat track testing, or tire simulation. The one or more tire stiffness coefficients may then be stored in the TMS of a tire at manufacture or at another time. The controller (401) then receives the tire stiffness coefficients for the tire from the TMS (e.g., via the TMS transceiver (405)). Data indicating the tire pressure may be received by the controller (401) from the TMS, from a valve-mounted pressure sensor, or from another sensor.

The rolling radius of the tire may be calculated as a ratio of the linear velocity of the wheel center to the angular velocity of the wheel. The linear velocity of the wheel center may be based on Global Positioning System (GPS) doppler data. The angular velocity of the wheel may be based on data from a wheel speed sensor (411) or a TMS. For example, the wheel speed sensor (411) may be a component of an Antilock Braking System (ABS). The controller (401) then calculates the rolling radius of the tire based on the data indicating the linear velocity of the wheel and the angular velocity of the wheel.

The controller (401) can then calculate the tread depth for the tire using a stored characteristic equation that accepts, as inputs, the load on the tire (determined from the CPL), the tire pressure, the tire stiffness, speed, and rolling radius of the tire. The controller (401) may be configured to calculate the tread depth in response to the tire reaching a steady temperature state. For example, when a vehicle begins driving from a cold start, the tire will increase in temperature until reaching a steady state (e.g., a constant temperature, a temperature varying to a degree falling below a threshold). The TMS may provide a temperature reading to the controller (401) to allow the controller (401) to determine that a steady temperature state has been reached. The TMS may also determine and signal to the controller (401) that a steady temperature state has been reached. One skilled in the art would appreciate that temperature data may be received from other temperature sensors, such as a vehicle-mounted outside air temperature sensor.

Although the calculation of tread depth using the CPL of a tire is discussed as being determined by the controller (401), it is understood that the calculations and determinations set forth above may be performed at least in part by the TMS and provided to the controller (401). Moreover, it is understood that peak radial displacement or another tire deformation may also be calculated and used to determine tire load, and therefore determine tread depth. As the tire load is determined based on a tire-specific CPL (or other deformation) measurement, the tread depth calculation is more accurate than other approaches that use vehicle height sensors or other vehicle-relative measurements.

Figure 5:
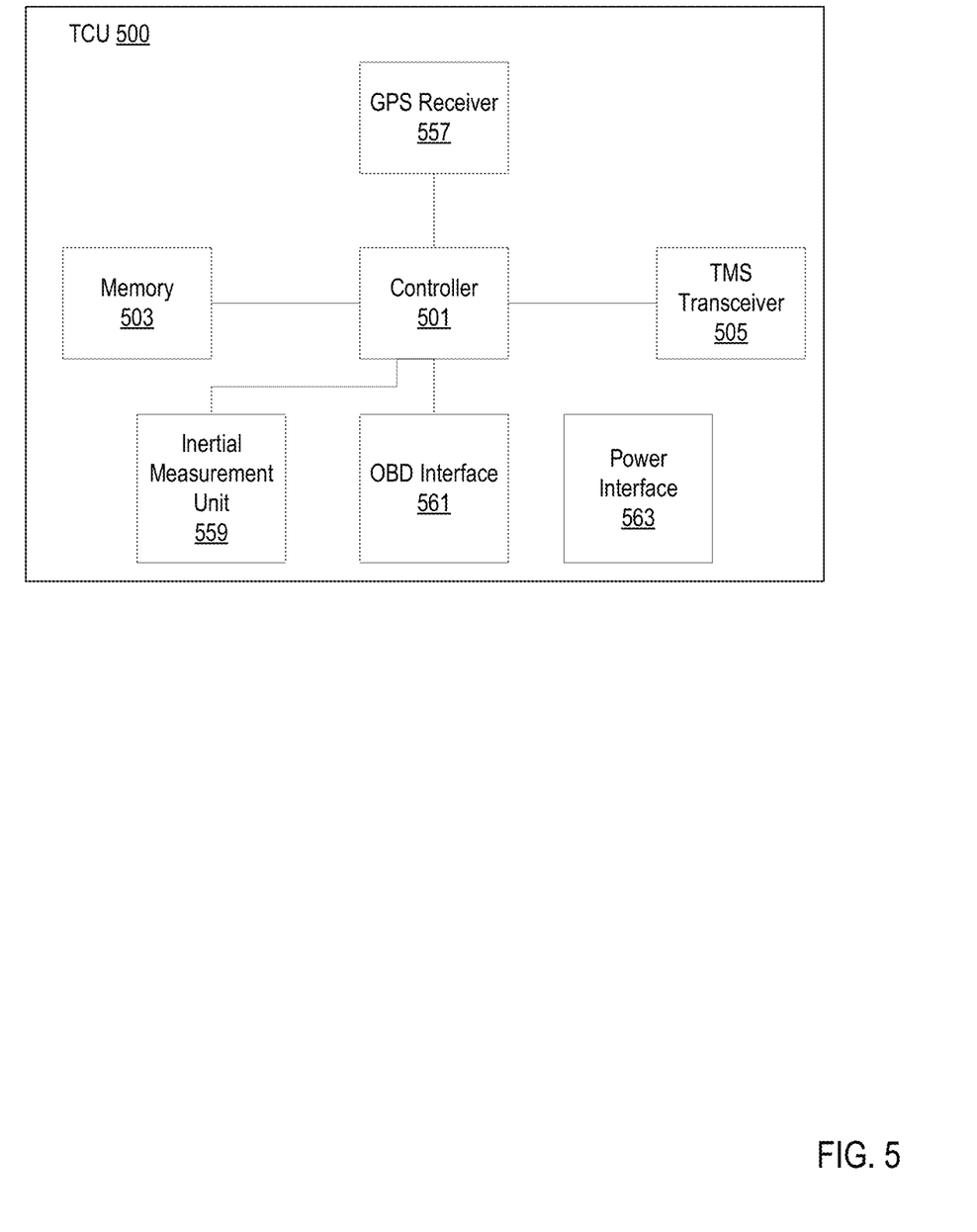
FIG. 5 illustrates another block diagram of an exemplary Telematics Control Unit (TCU) in accordance with the present disclosure.

For further explanation, FIG. 5 sets forth a diagram of an embodiment of a Telematics Control Unit (TCU) (500) (e.g., an aftermarket system not directly coupled to vehicle based sensors. The TCU (500) includes a controller (501), memory (503), and TMS transceiver (505) performing similar functions as described above with respect to the VCS (400) FIG. 4. The TCU (500) also includes a Global Positioning System (GPS) receiver (557) configured to communicate with one or more GPS satellites in order to determine a vehicle location, speed, direction of movement, etc. The TCU (500) also includes an inertial measurement unit (IMU) (559) configured to measures a vehicle's specific force, angular rate, and/or orientation using a combination of accelerometers, gyroscopes, and/or magnetometers. The TCU (500) also includes an on-board diagnostics (OBD) interface (561) for coupling the TCU (500) to one or more on-board diagnostic devices of a vehicle. The TCU (500) may receive power via a power interface (563) couplable to a vehicle power bus.

In a particular embodiment, the controller (401) of the TCU (500) may be configured to determine, based on data collected by a TMS, a tire deformation for a tire. The controller (501) may also be configured to determine, based on the tire deformation, an effective rolling radius of the tire; and determine, based at least one the effective rolling radius of the tire, an estimated tread depth for the tire.

Figure 6:
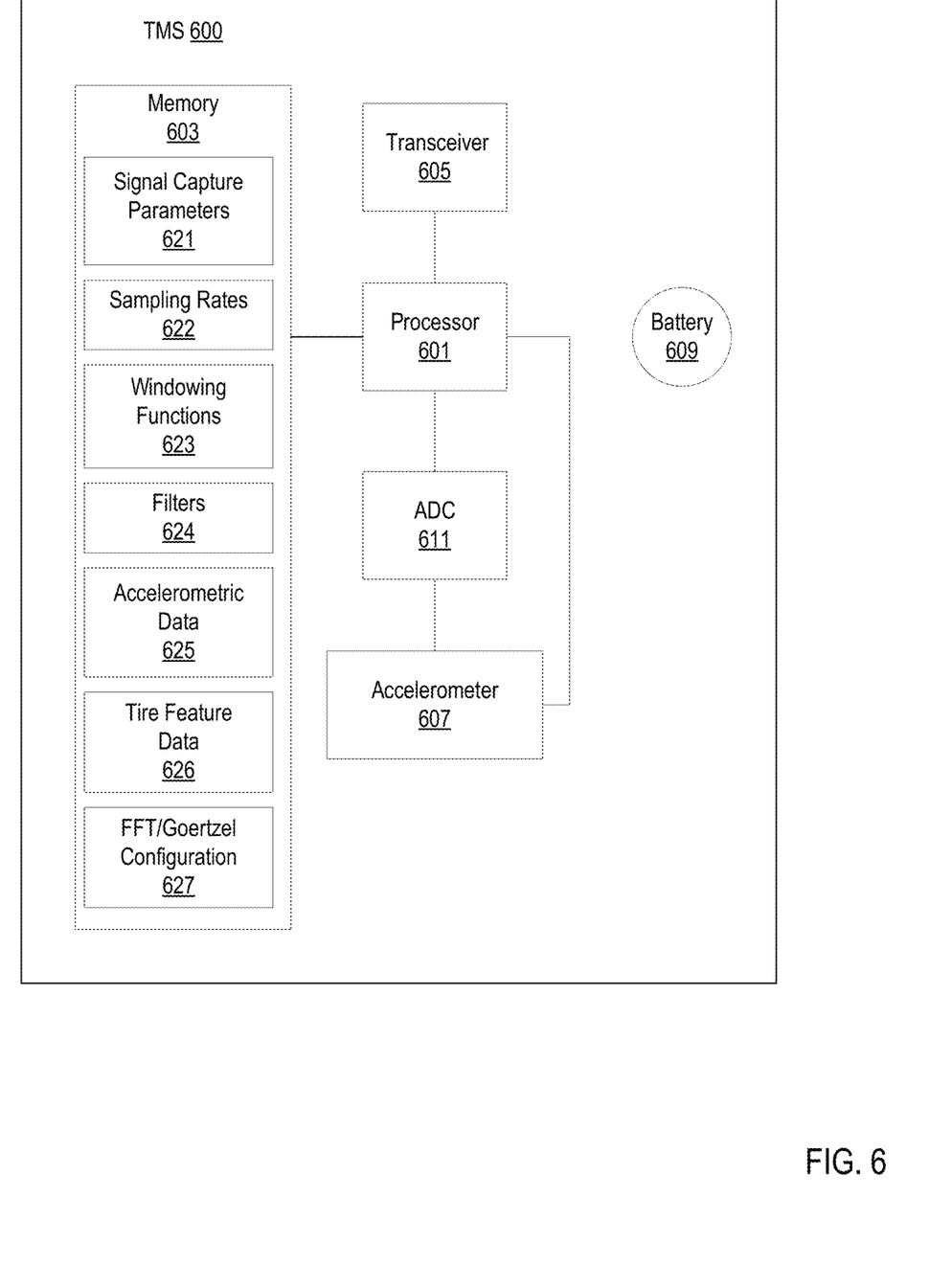
FIG. 6 illustrates a block diagram of an exemplary TMS in accordance with the present disclosure.

For further explanation, FIG. 6 sets forth a diagram of an exemplary TMS (600) for determining tread depth according to embodiments of the present disclosure. The TMS (600) includes a processor (601). The processor may include or implement a microcontroller, an Application Specific Integrated Circuit (ASIC), a digital signal processor (DSP), a programmable logic array (PLA) such as a field programmable gate array (FPGA), or other data computation unit in accordance with the present disclosure.

The TMS (600) of FIG. 6 also includes a memory (603) coupled to the processor (601). The memory may store signal capture configuration parameters (621) and other data received from the VCS (400). The memory (603) may store a sampling rates table (622) of sampling rates each corresponding to a specific parameter value, e.g., a wheel speed or rotational period of the tire. The memory (603) may also store a windowing function table (623) of windowing functions each corresponding to a specific parameter value, e.g., a wheel speed or rotational period of the tire. The memory (603) may also store a filter table (624) filter frequency bands, each corresponding to a specific parameter value, e.g., a wheel speed or rotational period of the tire. The memory (603) may also store accelerometric data (625), including a raw digital signal sampled from the accelerometer (607) by the ADC (611) and a processed accelerometric waveform processed by the processor (601). The memory (603) may also store tire feature data (626), such as an CPL or PRD extracted by the processor (601). The memory (603) may also store FFT or Goertzel algorithm configurations (627).

For bidirectional wireless communication with the VCS (400), the TMS (600) of FIG. 6 includes a transceiver (605) coupled to the processor (601). In one embodiment, the transceiver (605) is a Bluetooth Low Energy transmitter-receiver. In other embodiments, the transceiver (605) may be other types of low energy bidirectional communication technology that is intended to conserve energy consumed in the TMS (600). The TMS (600) transmits extracted tire feature data, such as acceleration profiles, PRD, and CPL, to the VCS (400) via the transceiver (605). In an alternative embodiment, the TMS (600) includes a unidirectional transmitter configured to transmit data to the VCS (400).

The accelerometer (607) of FIG. 6 may also be an acceleration sensor, an accelerometric device, a shock sensor, a force sensor, a microelectromechanical systems (MEMS) sensor, or other device that is similarly responsive to acceleration magnitude and/or to changes in acceleration. For example, an accelerometer senses acceleration in the radial plane (z-plane) and outputs an electric pulse signal responsive to sensed acceleration. In an embodiment, the accelerometer (607) is configurable with an accelerometer range, a wheel speed parameter, or other vehicle parameter provided by the VCS (400). For example, g-offset can be determined via wheel speed sensor or another vehicle parameter and used to capture and process signals faster. Accelerometers may have a selectable range of forces they can measure. These ranges can vary from ±1 g up to ±700 g. An example range of an accelerometer is ±200 g. The accelerometer range may be configured based on wheel speed, for example, ±150 g at a low speed, ±250 g at a medium speed, and ±500 g at a high speed. Typically, the smaller the range, the more sensitive the readings will be from the accelerometer.

The TMS (600) of FIG. 6 also includes an analog to digital converter (ADC) (611) that receives the electric pulse signals from the accelerometer (607) and samples them according to a sampling rate. The ADC (611) converts the raw analog signals received from the accelerometer (607) into a raw digital signal that is suitable for digital signal processing. The sample rate of the ADC (611) may be configured via wheel speed from the wheel speed sensor or another vehicle-provided parameter from a vehicle sensor.

The TMS (600) of FIG. 6 also includes a battery (609) connected to a power bus (not shown) to power the transceiver (605), the processor (601), the ADC (611), the accelerometer (607), and the memory (603). One skilled in the art that the TMS (600) may be powered by other sources alternative to or in addition to the battery (609), such as an energy harvester or other power source.

In some embodiments, the TMS (600) may be configured to calculate tread depth while driving. For example, the TMS (600) may determine the CPL of a tire based on data from the accelerometer (607). In this example, CPL may be estimated by measuring the time at which the radial acceleration is returning to and is at zero g. This time is then expressed as a quotient/ratio of the time for a complete rotation, and the CPL is derived from its ratio of the known tire circumference. The processor (601) can then determine the load for the tire using a stored characteristic equation for determining load based on the CPL and other factors, such as tire pressure, tire speed, tire temperature, etc. For example, the controller (601) can calculate these other factors from sensors in the TMS, or receive data indicating these factors from the VCS (400) as measured by other sensors (417) of the VCS (400), or receive data indicating these factors from other sensors (e.g., valve-mounted tire pressure sensors, etc.).

Having determined the load for the tire using the stored characteristic equation for determining the load based on the CPL, the processor (601) can then determine an estimated tread depth using a characteristic equation accepting, as input, a load on the tire, tire pressure, tire stiffness, speed, and rolling radius of the tire. The tire stiffness may be expressed as tire stiffness parameters stored in memory (603) (e.g., as tire feature data (626)). Data indicating the tire pressure may be received from a valve-mounted pressure sensor or determined by the TMS (600).

The rolling radius of the tire may be calculated as a ratio of the linear velocity of the wheel center to the angular velocity of the wheel. The TMS (600) may receive, from the VCS (400), data indicating the linear velocity of the wheel (e.g., based on GPS doppler data) and data indicating the angular velocity of the wheel (e.g., based on data from a wheel speed sensor (411) of the VCS (400). The processor (601) then calculates the rolling radius of the tire based on the data indicating the linear velocity of the wheel and the angular velocity of the wheel.

The processor (601) can then calculate the tread depth for the tire using a stored characteristic equation that accepts, as inputs, the load on the tire (determined from the CPL), the tire pressure, the tire stiffness, speed, and rolling radius of the tire. The processor (601) may be configured to calculate the tread depth in response to the tire reaching a steady temperature state. The TMS (600) may then send the estimated tread depth to the VCS (400) (e.g., via the transceiver (605)).

Although the calculation of tread depth using the CPL of a tire is discussed as being determined by the processor (601) of the TMS (600), it is understood that the calculations and determinations set forth above may be performed at least in part by the VCS (400) and provided to the TMS (600). Moreover, it is understood that peak radial displacement or another tire deformation may also be calculated and used to determine tire load, and therefore determine tread depth. Furthermore, although the TMS (600) is discussed interacting with a VCS (400), it is understood that similar functionality may be achieved by communicating with a TCU (500).

Figure 7:
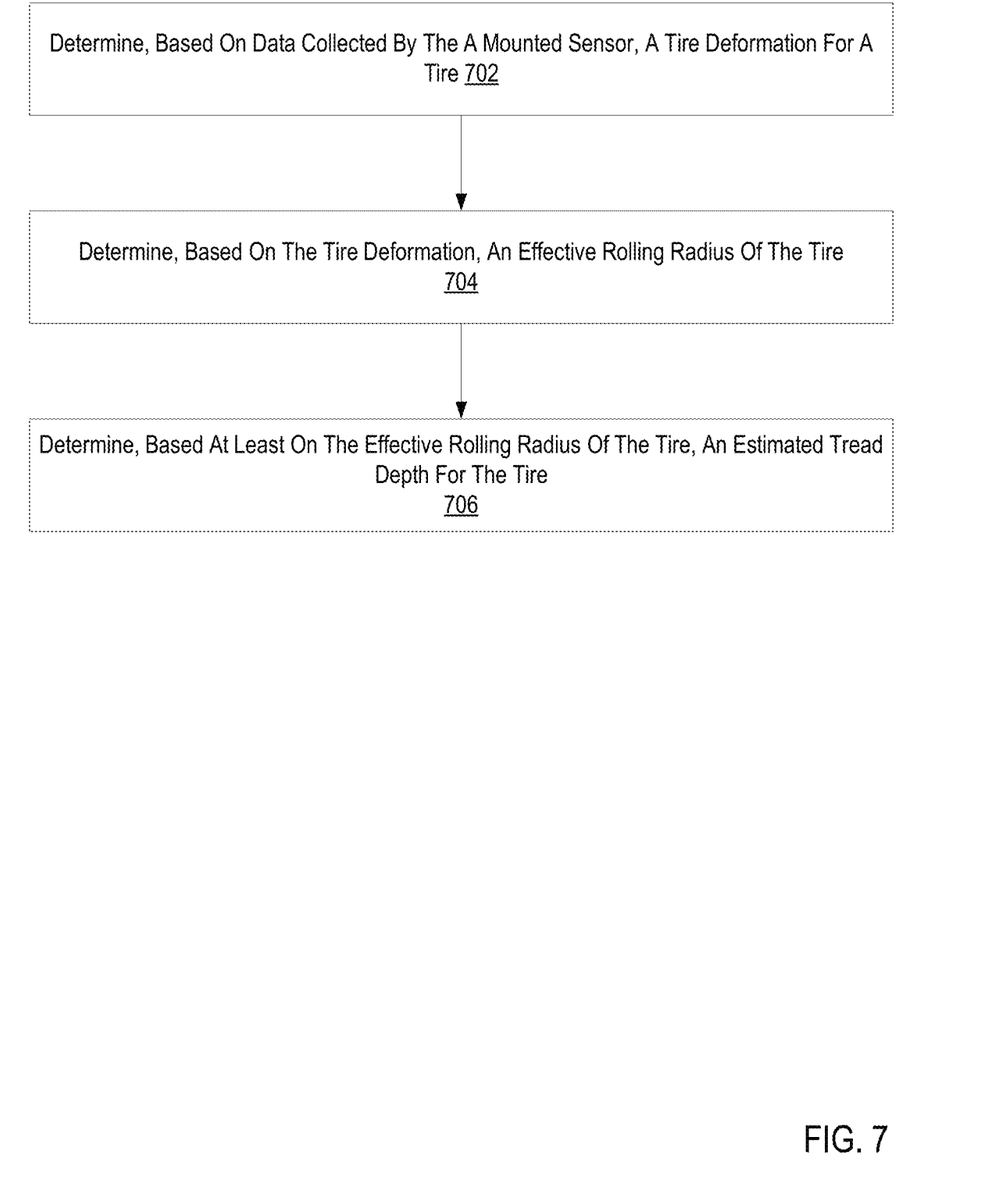
FIG. 7 is a flowchart of an example method for determining tread depth using data from a TMS in accordance with the present disclosure.

For further explanation, FIG. 7 sets forth a flow chart illustrating an exemplary method for determining tread depth using data from a tire mounted sensor (TMS) according to embodiments of the present disclosure that includes determining (702), (e.g., by the TMS (600), by a controller (401) of a VCS (400), or a controller (501) of a TCU (500)) based on data collected by a tire-mounted sensor (TMS) (600), a tire deformation for a tire. The tire deformation may include contact patch length (CPL), a peak radial deformation, or another deformation as can be appreciated. The TMS (600) may determine the tire deformation of a tire based on data from the accelerometer (607). For example, CPL may be estimated by measuring the time at which the radial acceleration is returning to and is at zero g. This time is then expressed as a quotient/ratio of the time for a complete rotation, and the CPL is derived from its ratio of the known tire circumference. Determining (702), based on data collected by a tire-mounted sensor (TMS) (600), a tire deformation for a tire may be carried out by a controller of a VCS or a controller of a TCU receiving the data collected from a TMS or receiving the tire deformation from the TMS. Alternatively, determining (702), based on data collected by a tire-mounted sensor (TMS) (600), a tire deformation for a tire may be carried out by the TMS calculating the tire deformation based on the data collected by the TMS.

The method of FIG. 7 also includes determining (704) (e.g., by the TMS (600), by a controller (401) of a VCS (400), or a controller (501) of a TCU (500)), based on the tire deformation, an effective rolling radius of the tire. An unloaded rolling radius of a tire is derived from the circumference of the tire. Based on the unloaded rolling radius of the tire and the CPL (or another tire deformation factor such as a peak radial deformation), an effective rolling radius of the tire is determined (e.g., a current rolling radius of the tire under load).

The method of FIG. 7 also includes determining (706) (e.g., by the TMS (600), by a controller (401) of a VCS (400), or a controller (501) of a TCU (500)), based on the effective rolling radius of the tire, an estimated tread depth for the tire. For example, a characteristic equation may be used to calculate tread depth based on tire load and the effective rolling radius of the tire. The tire load may be determined based on one or more other factors including tire pressure, tire speed, tire temperature, etc. For example, the tire speed may be determined by the TMS (600), by a wheel speed sensor, or otherwise determined. Thus, the determined tread depth is calculated using tire-specific deformations (e.g., CPL) and effective rolling radiuses to provide a more accurate determination of both load and tread depth.

Figure 8:
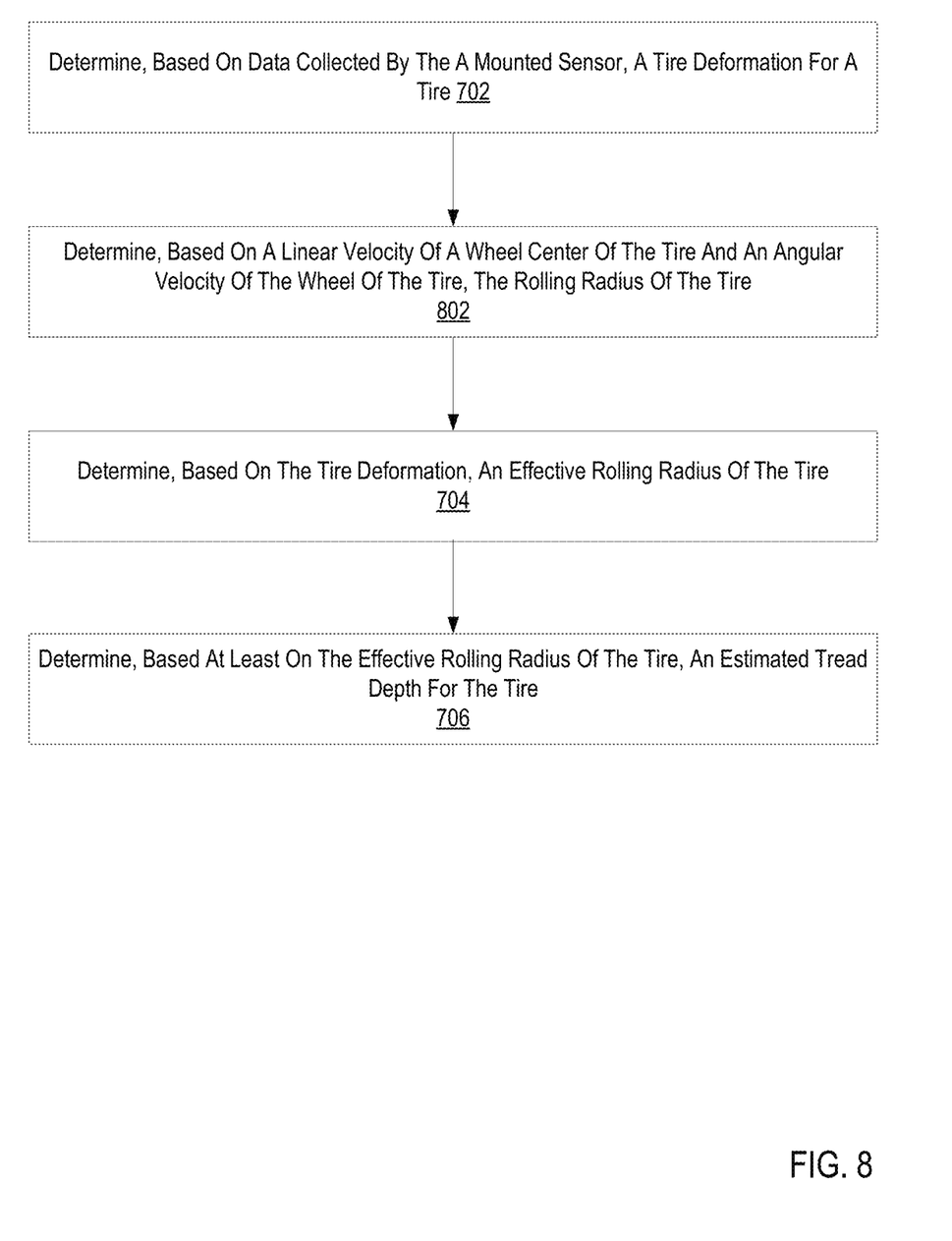
FIG. 8 is a flowchart of an example method for determining tread depth using data from a TMS in accordance with the present disclosure.

For further explanation, FIG. 8 sets forth a flow chart illustrating an exemplary method for determining tread depth using data from a tire mounted sensor (TMS) according to embodiments of the present disclosure that includes determining (702), based on data collected by a tire-mounted sensor (TMS) (600), a tire deformation for a tire; determining (704), based on the tire deformation, an effective rolling radius of the tire; and determining (706), based at least on the effective rolling radius of the tire, an estimated tread depth for the tire.

The method of FIG. 8 differs from FIG. 7 in that the method of FIG. 8 also includes determining (802) (e.g., by the TMS (600), by a controller (401) of a VCS (400), or a controller (501) of a TCU (500)), based on a linear velocity of a wheel center of the tire and an angular velocity of the wheel of the tire, the rolling radius of the tire. The rolling radius of the tire may be calculated as a ratio of the linear velocity of the wheel center to the angular velocity of the wheel. The linear velocity of the wheel center may be based on Global Positioning System (GPS) doppler data. The angular velocity of the wheel may be based on data from a wheel speed sensor (411) of the (VCS). The TMS (600) and/or the controller (401, 501) may receive the data indicating the linear velocity of the wheel and angular velocity of the wheel and calculate the rolling radius of the tire. The calculated rolling radius of the tire may be then be used to determine the effective rolling radius for the tire.

Figure 9:
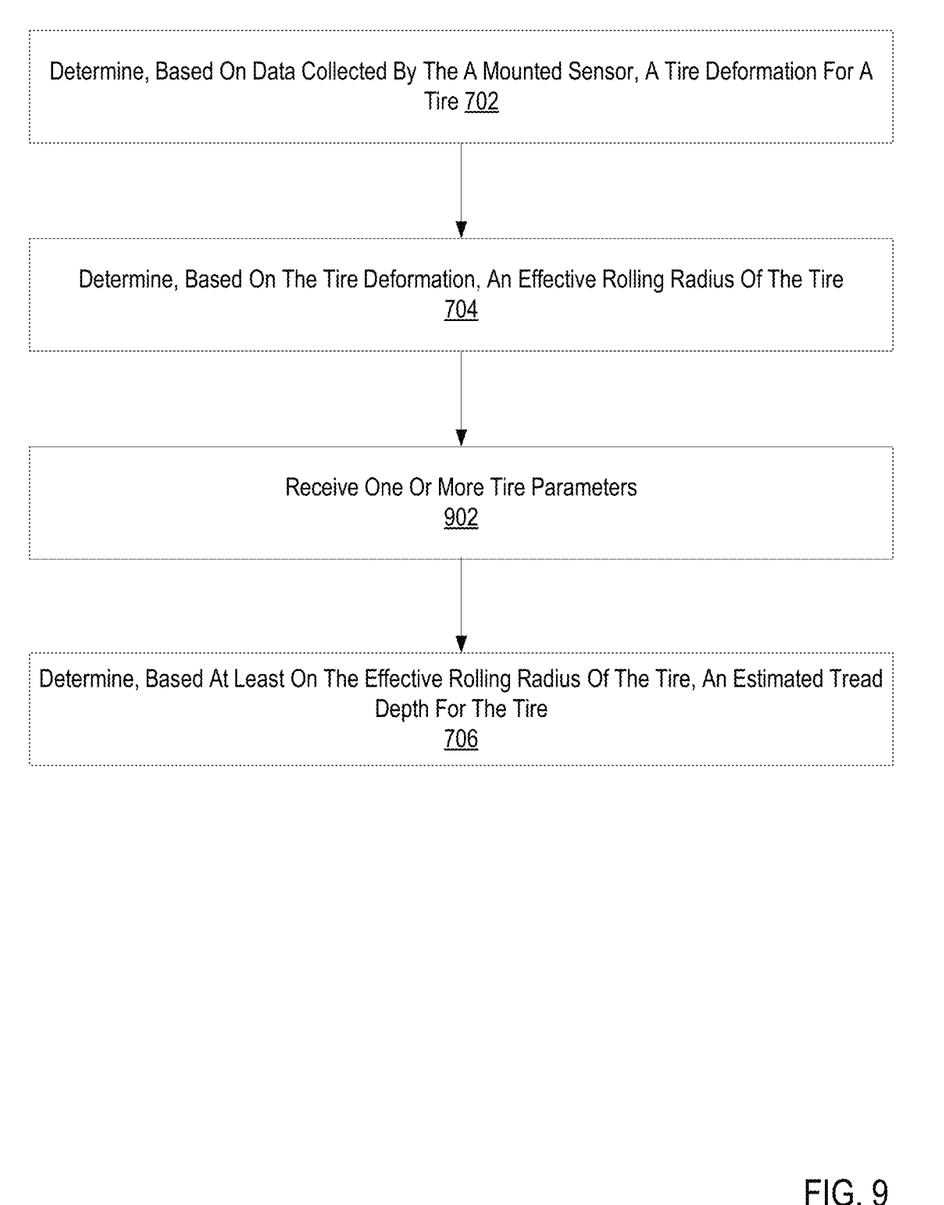
FIG. 9 is a flowchart of an example method for determining tread depth using data from a TMS in accordance with the present disclosure.

For further explanation, FIG. 9 sets forth a flow chart illustrating an exemplary method for determining tread depth using data from a tire mounted sensor (TMS) according to embodiments of the present disclosure that includes determining (702), based on data collected by a tire-mounted sensor (TMS) (600), a tire deformation for a tire; determining (704), based on the tire deformation, an effective rolling radius of the tire; and determining (706), based at least on the effective rolling radius of the tire, an estimated tread depth for the tire.

The method of FIG. 9 differs from FIG. 7 in that the method of FIG. 9 also includes receiving (902) (e.g., by the TMS (600), by a controller (401) of a VCS (400), or a controller (501) of a TCU (500)), one or more tire parameters. As was set forth above, the effective rolling radius for the tire may be expressed as a function of a load on the tire and a tread depth of the tire, and other tire parameters. Such other parameters may include a tire pressure, a tire stiffness, and/or a speed. The tire stiffness may be expressed as one or more tire stiffness parameters. For example, the one or more tire stiffness parameters may comprise one or more tire stiffness coefficients in a polynomial function for tire stiffness. For example, the one or more tire stiffness coefficients may be determined for a given tire model under varying loads and pressures using a drum tester, flat track testing, or tire simulation. The one or more tire stiffness coefficients may then be stored in the memory (603) of the TMS (600) of a tire at manufacture or at another time. The tire pressure may be determined by the TMS (600). The tire pressure may also be determined by a valve-mounted pressure sensor and provided to the TMS (600) and/or the controller (401) of the VCS (400) or the controller (501) of the TCU (500)).

The received (902) one or more parameters (e.g., the tire pressure, tire stiffness, and/or speed) may then be used to determine (706) the estimated tread depth for the tire. For example, the characteristic equation for calculating the tread depth for the tire may accept, as input, in addition to the estimated load of the tire and rolling radius of the tire, the tire pressure, tire stiffness, and/or speed.

In view of the explanations set forth above, readers will recognize that the benefits of determining tread depth using data from a tire mounted sensor (TMS) according to embodiments of the present disclosure include, but are not limited to:

The estimated load of a tire is calculated using tire-specific deformations measured by tire-mounted sensors, providing a more accurate estimation of tire load when compared to vehicle-specific measurements.

Load of a tire and tread depth are calculated using tire-mounted sensors, making the approach vehicle agnostic when compared to other approaches that rely on load sensors calibrated to the specific springs of a vehicle.

Tread depth is calculated using the more accurate tire-specific estimations of tire deformations, providing for a more accurate estimation of tread depth.

Exemplary embodiments of the present invention are described largely in the context of a fully functional computer system for determining tread depth using data from a tire mounted sensor (TMS). Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

The present invention may be a system, an apparatus, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatuses, or other devices to cause a series of operational steps to be performed on the computer, other programmable apparatuses or other devices to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, apparatuses, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present disclosure without departing from its true spirit. The descriptions in this specification are for purposes of illustration only and are not to be construed in a limiting sense. The scope of the present disclosure is limited only by the language of the following claims.

What is claimed is:

1. A method of determining tread depth using data from a tire mounted sensor (TMS), the method comprising:
   determining, by the tire mounted sensor (TMS) based on data collected by the TMS, a tire deformation for a tire;
   receiving, by the TMS, at least a linear velocity parameter from a vehicle control system of a vehicle on which the tire is mounted, the linear velocity parameter indicating a value of a linear velocity of a wheel center;
   determining, by the TMS, an effective rolling radius of the tire based on at least the tire deformation, the linear velocity parameter, and an angular velocity parameter; and
   determining, by the TMS based at least on the effective rolling radius of the tire, an estimated tread depth for the tire.

2. The method of claim 1, further comprising receiving, by the TMS, the angular velocity parameter from the vehicle control system, the angular velocity parameter indicating a value of an angular velocity of a wheel of the vehicle.

3. The method of claim 1, wherein the linear velocity is based on a Global Positioning System (GPS) doppler velocity.

4. The method of claim 1, wherein the angular velocity is based on wheel speed sensor data.

5. The method of claim 1, wherein determining the tire deformation for the tire comprises determining, based on radial acceleration data, a contact patch length.

6. The method of claim 1, wherein determining the estimated tread depth is further based on one or more tire stiffness coefficients.

7. The method of claim 6, wherein the one or more tire stiffness coefficients are stored in a memory of the TMS.

8. The method of claim 1, further comprising sending, by the TMS, the estimated tread depth to the vehicle control system.

9. A tire mounted sensor (TMS) comprising:
   a memory;
   a transceiver;
   one or more accelerometers; and
   a processor configured to perform the steps comprising:
   determining, based on data collected by the TMS, a tire deformation for a tire;
   receiving at least a linear velocity parameter from a vehicle control system of a vehicle on which the tire is mounted, the linear velocity parameter indicating a value of a linear velocity of a wheel center;
   determining, an effective rolling radius of the tire based on at least the tire deformation, the linear velocity parameter, and an angular velocity parameter; and
   determining, based at least on the effective rolling radius of the tire, an estimated tread depth for the tire.

10. The TMS of claim 9, further comprising receiving, by the TMS, the angular velocity parameter from the vehicle control system, the angular velocity parameter indicating a value of an angular velocity of a wheel of the vehicle.

11. The TMS of claim 9, wherein the linear velocity is based on a Global Positioning System (GPS) doppler velocity.

12. The TMS of claim 9, wherein the angular velocity is based on wheel speed sensor data.

13. The TMS of claim 9, wherein determining the tire deformation for the tire comprises determining, based on radial acceleration data, a contact patch length.

14. The TMS of claim 9, wherein determining the estimated tread depth is further based on one or more tire stiffness coefficients.

15. The TMS of claim 14, wherein the one or more tire stiffness coefficients is stored in the memory of the TMS.

16. The TMS of claim 9, wherein the steps further comprise sending, to the vehicle control system, the estimated tread depth.

* * * * *